J. L. FUNK.
COMBUSTION NOZZLE.
APPLICATION FILED APR. 16, 1913.
1,064,965.
Patented June 17, 1913.
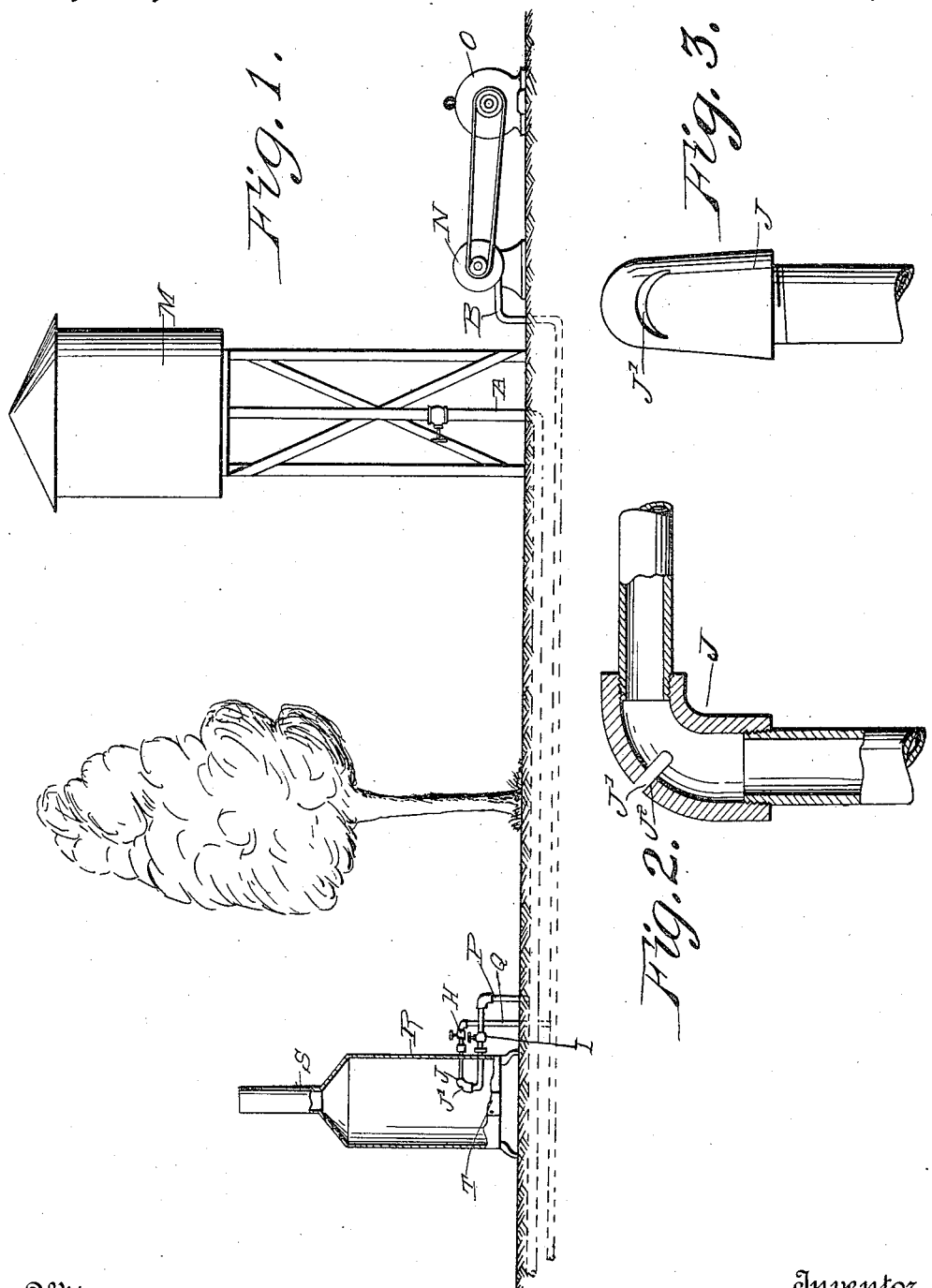

UNITED STATES PATENT OFFICE.

JOHN L. FUNK, OF SAN BERNARDINO, CALIFORNIA.

COMBUSTION-NOZZLE.

1,064,965.     Specification of Letters Patent.     Patented June 17, 1913.

Application filed April 16, 1913.   Serial No. 761,646.

*To all whom it may concern:*

Be it known that I, JOHN L. FUNK, a citizen of the United States of America, residing at San Bernardino, in the county of San Bernardino and State of California, have invented certain new and useful Improvements in Combustion-Nozzles, of which the following is a specification.

This invention relates to the means of distributing and combining oil and air for combustion for producing heat to protect fruit orchards and groves or any other vegetable growth from cold, as well as to produce heat in any place where heat is desired or required, and the object is to furnish convenient and sufficient means therefor.

A further object of this invention is to produce a combined mixing chamber and burner including an elbow having a radial slot therein forming a shoulder at an angle to the axis of a pipe for supplying air under pressure whereby air impinging the shoulder serves to diffuse the combined air and fuel, thereby increasing the efficiency of the burner.

A still further object of this invention is to provide novel means for distributing air and fuel in an economical way for its utilization at certain stations or positions with relation to the trees of an orchard, in order to provide for the greatest efficiency and economy.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of an apparatus such as is used for heating an orchard with the invention applied thereto; Fig. 2 illustrates a sectional view of a burner and the connections therefor; and Fig. 3 illustrates a view in elevation of the front of said burner.

In these drawings N denotes a source of air supply of such size or capacity as to provide the volume and pressure of air desired or required. The means for producing the air may be driven in any appropriate way by a motor O of any type.

A main air line B is provided, said air line being a pipe, conduit, tube or other distributing device in communication with the source of air supply and the said main air line may be run under, on top of, or above the ground. The main air line may have a distributing air line Q as shown in the drawing, the same being provided with a valve H, in order that the delivery of air may be regulated according to the requirements in practice.

In order to conduct or convey fuel to the heaters, a tank or reservoir M is supplied in an elevated position, preferably in order that fuel may be supplied throughout the system by gravity.

In practice, I prefer that the fuel used shall be crude oil, although I do not wish to be limited to the quality or kind of fuel used in the system. The reservoir M has a fuel line A connected to it which is regarded as a main fuel line and the said main fuel line has connected to it a delivery fuel line P to which latter line P one end of the combined air mixer and burner is connected, as will be presently explained. The delivery fuel line has a valve I for regulating the supply of fuel to the mixer, which will be presently explained.

It is to be understood that the dimensions or capacity of the several lines or pipes will be proportionate to the requirements in practice, the area to be piped and effectively heated and other considerations which the practical operation of the system necessitates.

As shown in Figs. 2 and 3, the combined air mixer and burner J is elbow shaped and has a radial slot J' extending from the convexed surface thereof to a suitable depth and width to permit the discharge therefrom of the necessary amount of fuel and air for combustion. The relation of the air mixer or burner J to the air supply and fuel delivery pipes is shown in Fig. 2 and it is preferable to have the wall $J^2$ of the burner opening at such angle with relation to the air delivery pipe that the air delivered by the said pipe may impinge the wall $J^2$ and pass from the air mixer in a substantially vertical direction for a purpose to be presently explained.

As has been stated a proper mixture may be obtained by regulating the supply of air and fuel and it will be found in practice that a comparatively large and hot flame issues from the burner.

In order to get the best results from a given quantity of fuel, I have found it desirable to inclose the burner in a casing R provided with a discharge pipe S, the said casing being relatively large and provided with a door T for the admission of air, which being heated by the flame from the burner is carried off by the discharge pipe S so that the surrounding atmosphere is heated. Furthermore, heat radiating from the casing R is effective in heating the surrounding atmosphere and it has been found in practice that injury to fruit trees can be prevented even though the surrounding temperature of the atmosphere is as low as zero. It follows, therefore, that the use of the apparatus will prevent injury to orchards, orange groves and other trees or vegetation which is to be protected from frosts and injurious frigid temperatures.

It is obvious also that the heater may be used in any general way as for the heating of houses or buildings or for cooking purposes and therefore, the inventor does not wish to be limited with respect to the employment of the invention.

I claim—

In a heating system, a combined mixer and burner consisting of an elbow having a slot therein, means for supplying air to one end of the elbow, and means for supplying fuel to the other end thereof, the said slot in the elbow having one of its walls standing at an angle to the axis of the air inlet end of the elbow.

In testimony whereof I affix my signature in the presence of two witnesses.

JOHN L. FUNK. [L. S.]

Witnesses:
 MOLLIE FUNK,
 MARY GLASS.

---

Copies of this patent may be obtained for five cents each, by addressing the " Commissioner of Patents, Washington, D. C."